United States Patent [19]
Brion

[11] Patent Number: 5,426,997
[45] Date of Patent: Jun. 27, 1995

[54] BICYCLE CHAIN DRIVE ASSEMBLY

[76] Inventor: Donald G. Brion, 164A Dunnemann Ave., Charleston, S.C. 29403

[21] Appl. No.: 82,716

[22] Filed: Jun. 28, 1993

[51] Int. Cl.⁶ .................. F16D 41/30; F16H 7/06
[52] U.S. Cl. .................. 74/594.1; 192/64; 474/160
[58] Field of Search ............ 192/64, 56 R, 107 R; 74/594.1; 474/81, 160

[56] References Cited

U.S. PATENT DOCUMENTS

| | | |
|---|---|---|
| 3,386,544 | 6/1968 | Matsuda . |
| 3,492,883 | 2/1970 | Maeda . |
| 4,145,095 | 3/1979 | Segawa .................. 384/545 |
| 4,150,859 | 4/1979 | Segawa et al. ........... 384/458 |
| 4,154,123 | 5/1979 | Nagano .................. 474/81 |
| 4,154,327 | 5/1979 | Haeussinger ............. 192/64 |
| 4,183,262 | 1/1980 | Segawa .................. 74/594.2 |
| 4,259,880 | 4/1981 | Ueno .................... 474/160 |
| 4,625,580 | 12/1986 | Burt ..................... 74/594.1 |
| 4,650,049 | 3/1987 | Stephens ................ 192/6 R |
| 4,840,084 | 6/1989 | Durham .................. 74/594.1 |

*Primary Examiner*—Charles A. Marmor
*Assistant Examiner*—Sherry Lynn Estremsky
*Attorney, Agent, or Firm*—Richard C. Litman

[57] ABSTRACT

A drive assembly is provided for a multi-speed pedal drive bicycle that allows the bicycle's gears to be shifted even when the pedals are not being trod upon. This advance in multi-speed bicycles is accomplished through a new front chain ring that is capable of freewheeling with respect to a crank axle in combination with the employment of a friction plate between the rear wheel hub and the rear freewheel cassette allowing 1:1 transmission of the rotation of the rear wheel to the rear freewheel cassette which continuously moves the chain of the bicycle provided the bicycle is moving.

8 Claims, 4 Drawing Sheets

BICYCLE CHAIN DRIVE ASSEMBLY

BACKGROUND OF THE INVENTION

1. Field of the Invention

The present invention relates to drive assemblies for chain driven bicycles. Most state-of-the-art multi-speed bicycle drive systems seen on both mountain and road bicycles on the market today utilize a three piece crank assembly, supported through a bottom bracket, for conveying the physical motion of a rider through a chain, about a rear freewheel cassette, and through both front and rear derailleurs so that the bicycle will move. However, in order to shift the gears on these bicycles, the rider must be in the process of pedaling the bicycle. This is due to the fact that the chain must be moving across the front chain rings and the rear freewheel cassette as well as the rear or front derailleur, whichever is being used at that time to change gears. Because the rear freewheel cassette is constructed not to rotate, i.e. it disengages, when the rider is not powering the bicycle and/or is coasting on the bicycle, as is common when descending a hill, the rider is unable to change gear or shift at that time. The present invention eliminates this problem of not being able to shift when not pedaling by providing a drive assembly that may be incorporated into any multi-speed bicycle having a three piece crank assembly and a rear freewheel cassette. The present invention accomplishes this by "freewheeling" the front chain rings of the crank assembly about the crank axle and by locking the rear freewheel cassette to rotate with the rear wheel. Hence, as long as the bicycle is moving, the chain will be moving and therefore, the gears may be shifted.

2. Description of the Prior Art

The patent record shows that one-way clutches for "freewheeling" both the rear cassette and the front chain rings of a bicycle have been patented in the past. Friction plates for locking a rear freewheel cassette at the same rotational speed as the rear wheel of a bicycle, however, are not as clearly defined within the patent record.

U.S. Pats. Nos. 3,386,544 and 4,650,049 issued to Minoru Matsuda on Jun. 4, 1968, and Charles W. Stephens on Mar. 17, 1987, respectively, disclose coaster brake apparatus. Matsuda's coaster brake is an automatically disengaging ratcheting coaster brake that engages and stops the hub of the wheel when a connected pedal is pressurized and disengages when the pedal is neutral or when the wheel of the bicycle is moved in a reverse direction. The Stephens patent discloses a rear hub for a bicycle that is capable of functioning both as a coaster brake and as a freewheel. Neither of these rear wheel hub engaging brake and freewheel mechanisms are fully removable from the hub without making it impossible for the bicycle to operate nor do they create a 1:1 transfer of rotational motion from the wheel to the hub as is accomplished by the friction plate of the present invention.

U.S. Pats. Nos. 4,145,095, 4,154,123, 4,154,327, and 4,840,084 disclose a number of ratchet-type one-way clutches, or freewheel cassettes, having a number of different configurations relating to the hub itself as well as the positioning of ball bearings therewithin. These devices will are not capable in their patented configurations to adapt to an existing crank axle and freewheel the front chain ring with respect to the crank axle.

Crank assemblies having the ability to freewheel are disclosed in U.S. Pats. Nos. 3,492,883, 4,450,859, and 4,183,262, issued to Tetsuo Maeda, Takashi Segawa et al. and Takashi Segawa, respectively. Maeda's drive chain gear of a bicycle suggests that it is possible to freewheel a front chain ring in such a manner that pedaling is not required to shift the gears of the bicycle. However, Maeda's invention does not have means for holding the rear freewheel at the same rotational speed as the rear wheel of the bicycle, thus shifting without pedaling is not always possible, it is only possible under certain, not all, coasting speeds. Looking now at Segawa's patents, two freewheeling cranks are disclosed; the first is a three piece crank while the second is a more traditional one piece crank. Specifically, Segawa's three piece crank, having freewheeling capabilities, requires the installation of a new crank assembly and bottom bracket. In addition, the one-way clutch mechanism of the freewheeling crank assembly is attached to the crank axle itself, thus it and the chain rings attached thereto, are not a part of the crank arm and cannot be easily removed.

None of the above inventions and patents, taken either singly or in combination, is seen to describe the instant invention as claimed.

SUMMARY OF THE INVENTION

Accordingly, it is a principal object of the invention to create a drive assembly for a bicycle that allows a rider of the bicycle to shift the gears of the bike at any time, provided the bicycle is in motion, without having to pedal.

It is another object of the invention to accomplish the above mentioned task through locking the rotation of the rear freewheel cassette of the bicycle to match the rotation of the rear wheel itself while simultaneously freewheeling the front chain rings of the bicycle at the location of the crank.

It is a further object of the invention to lock the freewheel of the bicycle by utilizing a friction plate inserted about the hub of the rear wheel between the rear freewheel cassette, the top flaired out portion of the hub, and the lower ends of the spokes where they engage the hub.

Still another object of the invention is to provide a new crank arm having a one-way clutch assembly incorporated therein that is readily attachable to the crank axle of any standard three piece crank assembly and capable of accepting standard chain rings, to allow the crank assembly to freewheel thus providing continuous motion of the chain even when the rider is not pedaling, provided the bicycle itself is in motion.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a drive assembly for a multi-speed bicycle that is capable of allowing a rider of the bicycle to shift the gears thereof without the requirement of pedaling the bicycle.

Figure 1:
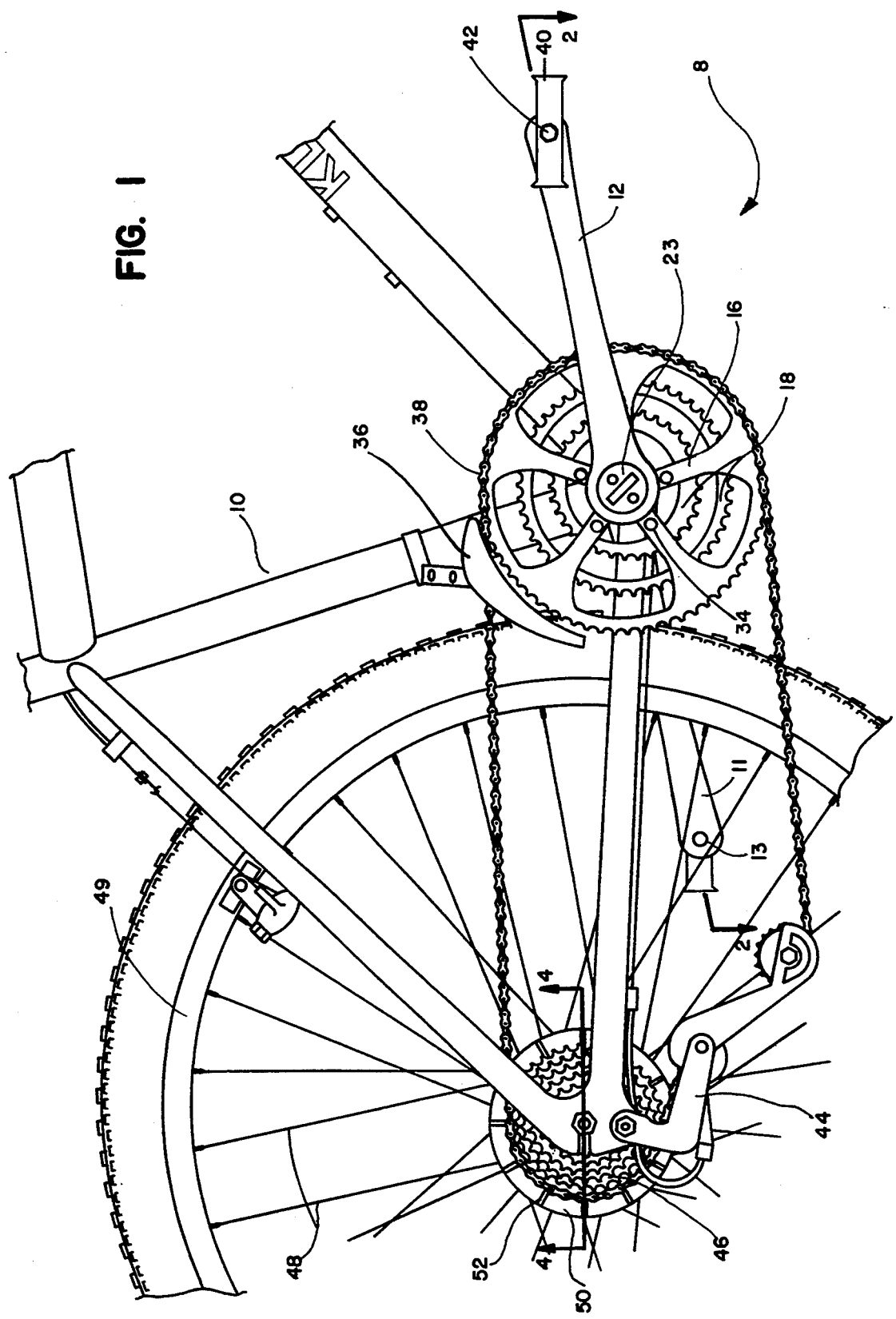
FIG. 1 is a side view of the drive assembly illustrating the freewheeling crank assembly as well as the friction plate as they would appear in place on a bicycle.

Referring now to the drawings, specifically FIG. 1, we see bicycle frame 10 partially illustrated showing the preferred embodiment of a drive assembly for a multi-speed bicycle that allows for shifting of the bicycle's gears without the need for pedaling. The drive assembly comprises a crank assembly 8, shown in detail in FIG. 2, and a friction plate 50, linked by a metallic link chain 38, and controlled by front 36 and rear 44 derailleurs. The crank assembly 8 may be incorporated into the multi-speed bicycle in two ways, either manufactured with the bicycle or retro-fitted thereto. With regard to the latter, the retro-fitting is easily accomplished by simply placing friction plate 50 between the back of rear freewheel 46 and the outer flange of rear wheel hub 54 that accepts spokes 48.

Once in place, the bicycle may be operated. To power the bicycle, the rider must exert some physical energy to start the bicycle moving. This is usually accomplished by treading downward with the feet onto the two pedals 40, of which one is attached to first crank arm 11 and the other is attached to second crank arm 12 by threaded pedal posts 42, which engage matingly threaded cylindrical bored opening 13 located at the distal ends of each crank arm 11 and 12. Once the bicycle is in motion, the gears may be changed through the utilization of either the front derailleur 36 or rear derailleur 44. No pedaling is necessary due to the nature of the crank assembly. The drive assembly is seen as having two main components, the first being freewheeling crank assembly 8 the second being friction plate 50.

Figure 2:
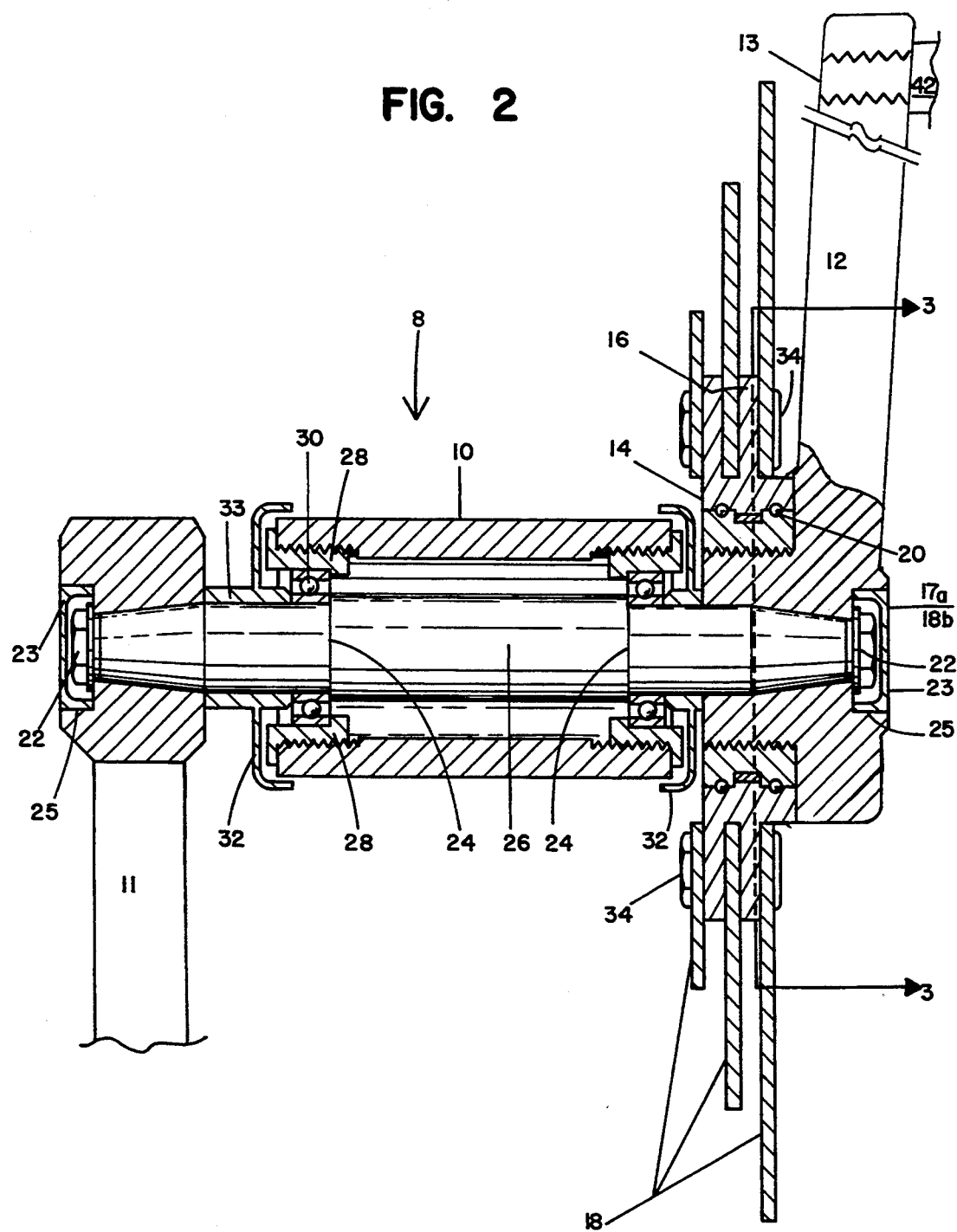
FIG. 2 is a sectional view of FIG. 1 taken along lines 2—2.

Crank assembly 8, FIG. 2, is of the typical three-piece construction that utilizes a crank axle 26 housed within a standard bottom bracket assembly 28 which is removably inserted into a lower chamber of frame 10. Crank axle 26 is further supported within bottom bracket assembly 28 by bottom bracket ball bearings 30 located in two ring-like sets about crank axle 26. This area of the bicycle is protected from the environment by mud guards 32 which cover the ends of the chamber of frame 10 which houses bottom bracket assembly 28 and also are seen as having sleeved apertures 33 which allow crank axle 26 to pass therethrough. The ends of crank axle 26 receive first crank arm 11 and second crank arm 12. Crank arm 11 receives crank axle 26 through a tapered four-sided passageway. Crank arm assembly 12 receives the opposite end of crank axle 26 through a two-stage passageway 24 that is seen as two open end-to-end cylinders of different diameters. Both crank arm 11 and crank arm assembly 12 are secured to crank axle 26 by crank arm retaining bolts 22 whose heads are recessed into bolt receiving areas 25 of crank arm 11 and crank arm 12, which are coaxial with respect to the axle receiving passageways 24 and are protected from the environment by crank arm retaining bolt caps 23.

Figure 3:
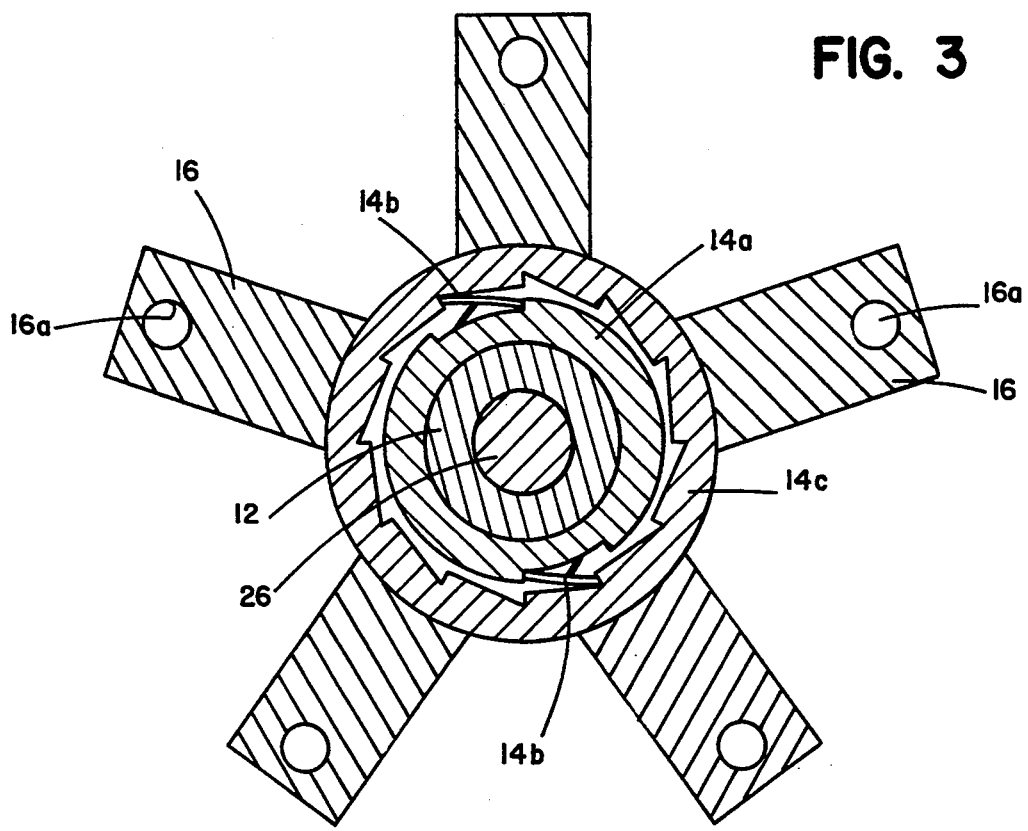
FIG. 3 is a sectional view of FIG. 2 taken along lines 3—3.

Focusing now on crank arm 12, one-way clutch mechanism 14 is removably secured to crank arm 12. One-way clutch 14 has a threaded, cylindrically shaped bore 17a in the center thereof for being secured about threaded area 17b at the end of crank arm 12, centrally encompassing therein receiving passageway 24. As can be seen clearly in FIG. 2 and FIG. 3, one-way clutch 14 is comprises: two ratcheting pawls 14b, 14b; a unidirectional clutch base 14a supporting the pawls 14b, and, an outer notched housing 14c for receiving pawls 14b when displaced. In addition, the ratcheting mechanism as described above that makes up one-way clutch 14 is supported between two circular sets of clutch ball bearings 20. Radially extending from outer circumference of one-way clutch 14, and being integrally constructed therewith, are five arms 16 having threaded bored openings 16a for accepting three chain rings 18, 18, 18 thereon with threaded fasteners 34.

Figure 4:
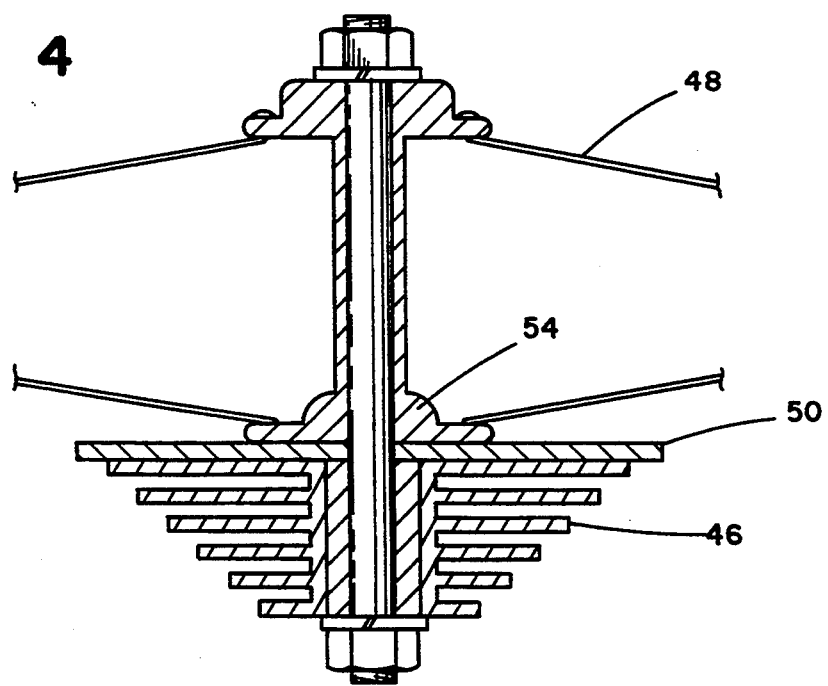
FIG. 4 is a sectional view of FIG. 1 taken along lines 4—4.
Figure 5:
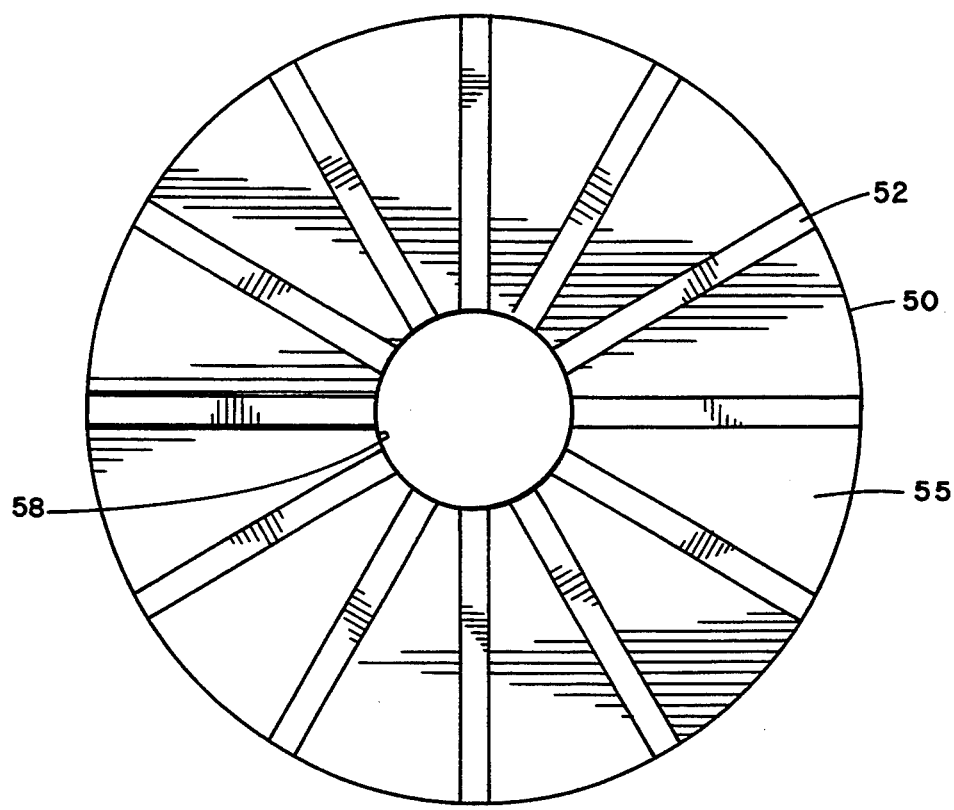
FIG. 5 is a side view of the first embodiment of the friction plate.
Figure 6:
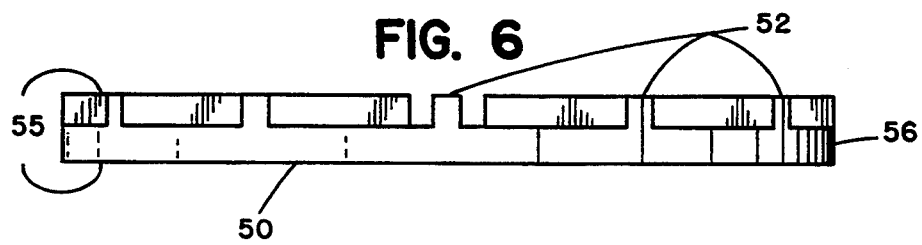
FIG. 6 is an end view of the first embodiment of the friction plate.

The second major component of the drive assembly is friction plate 50, having a central opening 58 (FIG. 5) therein, which is mounted about the axle of rear wheel 49 (FIG. 1), between freewheel cassette 46 and spoke receiving flange portion of hub 54 (FIG. 4). Friction plate 50, its first embodiment seen in FIG. 5 and 6, is a modified toroidal configuration having its sides 55 and edge 56 flattened and arranged such that the sides 55 thereof are normal to the edge 56. When installed, friction plate 50 transmits all rotational movement of rear wheel 49 to rear freewheel cassette 46, hence continuously moving chain 38 through the drive assembly. In order to enhance the grip of friction plate 50 on rear freewheel cassette 46, 10 raised freewheel engaging ridges 52 are constructed and positioned radially on one side 54 of the friction plate.

Figure 7:
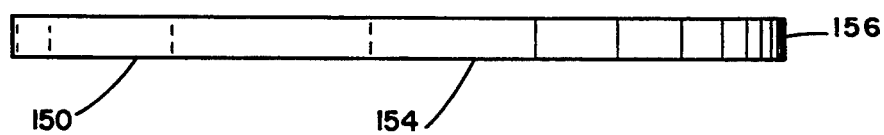
FIG. 7 is an end view of the second embodiment of the friction plate.
Figure 8:
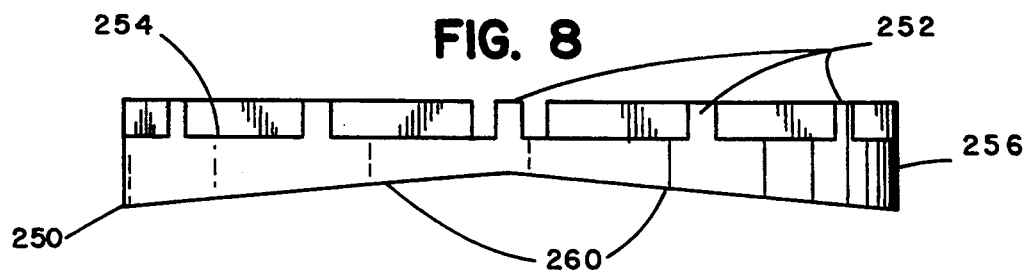
FIG. 8 is an end view of the third embodiment of the friction plate.

A second embodiment of the friction plate 50, friction plate 150, is shown in FIG. 7 as a flat, planar disk with sides 154 and edges 156. Lastly, a third embodiment of friction plate 50 is friction plate 250 shown in FIG. 8. Freewheel engaging ridges 252 are located on side 254. Edge 256 has a thickness greater than the plate thickness of the central opening 258 (not shown) yielding a tapered affect on the side of the plate that engages spokes 48. This taper 260 provides an additional grip on the spokes 48 of rear wheel 49 to prevent slipping of friction plate 250.

It should be further stated that all three friction plates 50, 150, and 250 have been designed to break away and disengage should an excessive and sudden torsional force be applied thereto. Such a force may come from the derailment of the chain off either chain rings 18, or off of rear freewheel cassette 46.

It is to be understood that the present invention is not limited to the sole embodiments described above, but encompasses any and all embodiments within the scope of the following claims.

I claim:

1. A drive assembly for a chain drive bicycle having front and rear wheels, a bottom bracket assembly, front and rear derailleurs, and a rear freewheel cassette, said drive assembly comprising;

a crank assembly comprising:

a crank axle housed within and supported by a bottom bracket assembly;

a first crank arm having receiving means for being removably attached to said crank axle and accepting means for removably accepting a pedal; and, a second crank arm assembly comprising:

a first end having accepting means for removably accepting a pedal;

a second end having receiving means for being removably received upon a crank axle;

a one-way clutch assembly encompassing and secured about said second end receiving means, and having extending therefrom, attachment means, for accepting a plurality of chain rings;

a plurality of chain rings for transferring motion from the crank drive assembly to a chain that in turn rotates the rear freewheel assembly and wheel to which it is attached; and a friction plate, inserted about the axle of the rear wheel and between the rear freewheel and a hub and spoke area of the rear wheel, whereby said friction plate allows the rotation of the freewheel and the rear wheel to be a 1:1 correspondence such that when the bicycle is coasting, the chain, encompassing the rear freewheel, is being driven by the rotation of the rear wheel, which through the incorporation of said friction plate, rotates the rear freewheel but is free to disengage the freewheel under extreme torsional conditions.

2. The drive assembly according to claim 1, wherein:
said accepting means at said first end of said second crank arm assembly comprises a cylindrical bore, tapped to receive the standard threaded post of a pedal.

3. The drive assembly according to claim 1, wherein: said receiving means at said second end of said second crank arm assembly comprises a through passageway in the shape of two end-to-end, cylindrically shaped, bores for accepting a crank axle and a crank arm retaining bolt.

4. The drive assembly according to claim 1, wherein:
said second end of said second crank arm assembly is threaded about said second end receiving means so that said one-way clutch assembly, having a matingly threaded portion, may be removably secured thereto.

5. The drive assembly according to claim 1, wherein:
said one-way clutch assembly attachment means comprises a plurality of radially extending arms originating from said one-way clutch assembly having threaded bores at the ends of each said arm for receiving threaded fasteners for securing of plurality a chain rings to said one-way clutch assembly.

6. The drive assembly according to claim 5, wherein:
said plurality of radially extending arms comprises five radially extending arms.

7. The drive assembly according to claim 1, wherein:
said friction plate has a modified toroidal shape such that its outer surfaces are flattened and are seen as being normal to one another.

8. The drive assembly according to claim 1, wherein:
said friction plate, having a modified toroidal shape such that its outer surfaces are flattened and are seen as being normal to one another, is further seen as having ten, raised, radially positioned, freewheel engaging ridges of rectangular cross-section incorporated onto one of the planar sides of said friction plate.

* * * * *